(12) United States Patent
Igashira et al.

(10) Patent No.: US 6,455,122 B1
(45) Date of Patent: Sep. 24, 2002

(54) HEAT-RESISTING FIBER-REINFORCED COMPOSITE MATERIAL AND MANUFACTURING METHOD THEREOF

(75) Inventors: Kenichiro Igashira, Akashi; Koji Nishio, Kobe, both of (JP)

(73) Assignee: Kabushiki, Kaisha Senshinzairyoriyo Gas Generator Kenkyujo, Tokyo (JP)

( * ) Notice: Subject to any disclaimer, the term of this patent is extended or adjusted under 35 U.S.C. 154(b) by 0 days.

(21) Appl. No.: 09/782,298

(22) Filed: Feb. 14, 2001

(30) Foreign Application Priority Data

Sep. 29, 2000 (JP) ........................................ 2000-298336

(51) Int. Cl.$^7$ ................................................ B32B 1/04
(52) U.S. Cl. ........................ 428/74; 428/902; 428/367; 264/272.13; 264/331.12
(58) Field of Search ............................ 501/128, 152, 501/153; 428/293.4, 920, 76, 64, 74, 285, 408, 367, 284, 902; 264/102, 500, 548, 331.12, 331.16, 272.11

(56) References Cited

U.S. PATENT DOCUMENTS

| | | | | |
|---|---|---|---|---|
| 4,681,718 A | * | 7/1987 | Oldharm | 264/102 |
| 4,713,275 A | * | 12/1987 | Riccofiello et al. | 428/76 |
| 5,260,125 A | * | 11/1993 | Copes | 428/285 |
| 6,083,861 A | * | 7/2000 | Sarohan et al. | 501/128 |

\* cited by examiner

*Primary Examiner*—Merrick Dixon
(74) *Attorney, Agent, or Firm*—Rader, Fishman & Grauer, PLLC (57) ABSTRACT

The heat resisting fiber-reinforced composite material of the invention is a heat-resisting fiber-reinforced composite material used for a product or a part that generates temperature distribution; wherein the thermal expansion coefficient at a portion corresponding to a medium to low temperature range is greater than the thermal expansion coefficient at a portion corresponding to a high temperature range, and the boundary between the portion corresponding to medium to low temperature range and the portion corresponding to the high temperature range is a transition region.

6 Claims, 12 Drawing Sheets

▨ : Ceramic fiber – reinforced glass
(high strength, ~1,200 °C)

▧ : Ceramic fiber – reinforced ceramics
(high heat resistance, ~1,400 °C)

— Ceramic fiber bundle
— - - Glass fiber bendle

FIG. 17

— Ceramic fiber bundle

—·· Ceramic fiber bundle impregnated with glass powder

HEAT-RESISTING FIBER-REINFORCED COMPOSITE MATERIAL AND MANUFACTURING METHOD THEREOF

TECHNICAL FIELD OF THE INVENTION

The present invention relates to a heat-resisting fiber-reinforced composite material and manufacturing method thereof. More particularly, it relates to a heat-resisting fiber-reinforced composite material used for gas turbine combustors, moving and stationary blades, heat resisting panels for space shuttles, and heat shielding partition walls, and manufacturing method thereof.

BACKGROUND ART

Conventionally, there has been much attention paid to ceramic fiber-reinforced ceramics that is a kind of composite material as a material used for gas turbine combustors, moving and stationary blades, heat resisting panels for space shuttles, and heat shielding partition walls.

However, it is difficult to precisely fill a ceramic base material into ceramic fiber in the manufacturing process, and there exists a lot of internal defects in the ceramic fiber-reinforced ceramics obtained. Accordingly, when a gas turbine combustor or the like is manufactured by using such ceramic fiber-reinforced ceramics, the gas turbine combustor or the like thus manufactured is unable to assure the designed strength.

On the other hand, in the case of fiber-reinforced glass that is a kind of composite material, the glass used as a base material is relatively easier to soften and melt, and it is possible to precisely fill the glass into the fiber. Accordingly, the strength of fiber-reinforced glass using glass as a base material is excellent. And, in the case of a composite material using glass-based ceramic fiber, it is possible to make the composite material very high in strength since glass may be precisely filled into ceramic fiber. Accordingly, a gas turbine combustor or the like made up of such ceramic fiber-reinforced glass may assure a very high strength.

However, fiber-reinforced glass capable of maintaining a sufficient strength at temperatures exceeding 1,200 degree C. is not available yet because of heat resistance capability of the glass. Therefore, a gas turbine combustor or the like made up of such ceramic fiber-reinforced glass cannot be used for parts exposed to a temperature higher than 1,200 degree C.

In the meantime, even in the case of a part such as a gas turbine combustor or the like required to be heat-resistant, the entire part is not always uniformly exposed to high temperatures. For example, it is well known that, in a gas turbine combustor, the temperature of the portion exposed to the flames becomes a high temperature level of about 1,200~1,300 degree C. while the temperature of the portion where the combustor is fitted to the gas turbine body becomes a medium temperature level of about 700 degree C.

Also, it is known that such temperature difference generated in same part can cause generation of a thermal stress in accordance with the temperature difference. Further, the thermal stress is increased as the thermal expansion is restrained. It can be said with respect to a gas turbine combustor that the thermal stress becomes higher at the portion where the combustor is fitted to the gas turbine body. Accordingly, if the combustor is fitted to the gas turbine body simply by using bolts and nuts for example, the portion where the combustor is fitted to the gas turbine will be damaged due to the thermal stress in use. Therefore, it is necessary to lessen the thermal stress generated at the fitting portion. In a conventional method, a flexible structure using a spring or the like is employed to release the thermal stress generated at the portion where the combustor is fitted to the gas turbine body, which causes the structure to become complicated. Also, there is less freedom in design because the structure is complicated.

Further, when making a combustor wherein a region of ceramic fiber-reinforced ceramics being able to withstand high temperatures and a region of ceramic fiber-reinforced glass being unable to withstand high temperatures but high in strength are selectively formed, it is preferable to let the material transfer in a transition manner for the purpose of reducing the stress at the boundary between the both regions.

For example, at the boundary between the region of ceramic fiber-reinforced ceramics at the high temperature side and the region of ceramic fiber-reinforced glass at the low temperature side, it is preferable to use ceramic fiber-reinforced ceramics on the inside and ceramic fiber-reinforced glass on the outside while gradually reducing the thickness of ceramic fiber-reinforced ceramics layer towards the ceramic fiber-reinforced glass region on the low temperature side and, on the other hand, gradually increasing the thickness of ceramic fiber-reinforced glass layer towards the ceramic fiber-reinforced glass region. However, there is no such structure and method developed in the past.

The present invention has been made in order to solve the problems of such prior art, and an object of the invention is to provide a heat-resisting fiber-reinforced composite material being able to achieve a desired heat resistance and strength and to reduce generation of thermal stress, and manufacturing method thereof.

SUMMARY OF THE INVENTION

A heat-resisting fiber-reinforced composite material of the present invention is a heat-resisting fiber-reinforced composite material used for a product or a part that generates temperature distribution, characterized in that the thermal expansion coefficient at a portion corresponding to a medium to low temperature range is greater than the thermal expansion coefficient at a portion corresponding to a high temperature range and that the boundary between the portion corresponding to the medium to low temperature range and the portion corresponding to the high temperature range is a transition region.

A heat-resisting fiber-reinforced composite material of the present invention is specifically a heat-resisting fiber-reinforced composite material used for a product or a part that generates temperature distribution, characterized in that a portion corresponding to a medium to low temperature range is heat-resisting fiber-reinforced glass of which thermal expansion coefficient is greater than that of heat-resisting fiber-reinforced ceramics, a portion corresponding to a high temperature range is heat-resisting fiber-reinforced ceramics, and the boundary between the portion corresponding to the medium to low temperature range and the portion corresponding to the high temperature range is a transition region of heat-resisting fiber-reinforced glass and heat-resisting fiber-reinforced ceramics.

In a heat-resisting fiber-reinforced composite material of the present invention, the heat-resisting fiber is, for example, ceramic fiber.

On the other hand, a method of manufacturing a heat-resisting fiber-reinforced composite material of the present invention is a heat-resisting fiber-reinforced composite material used for a product or a part that generates temperature distribution, characterized in that a portion corresponding to a medium to low temperature range is heat-resisting fiber-reinforced glass of which thermal expansion coefficient is greater than that of heat-resisting fiber-reinforced ceramics, a portion corresponding to a high temperature range is heat-resisting fiber-reinforced ceramics, and the boundary between the portion corresponding to the medium to low temperature range and the portion corresponding to the high temperature range is a transition region of heat-resisting fiber-reinforced glass and heat-resisting fiber-reinforced ceramics, thereby pre-forming a molding in a desired shape through weaving, and the pre-formed molding is subjected to matrix forming treatment in order to obtain a heat-resisting fiber-reinforced composite material in the desired shape.

In a method of manufacturing a heat-resisting fiber-reinforced composite material of the present invention, weaving of ceramic fiber impregnated with glass powder at a specified ratio is for example performed.

Since a heat-resisting fiber-reinforced composite material is configured as described, it is possible to achieve necessary heat resistance and strength at the same time and also to reduce the thermal stress generated at the boundary between different materials. Accordingly, it is possible to improve the durability of parts manufactured by using the heat-resisting fiber-reinforced composite material.

On the other hand, a method of manufacturing a heat-resisting fiber-reinforced composite material of the present invention is configured as described, and it is possible to manufacture a heat-resisting fiber-reinforced composite material having aforementioned characteristics.

Also, a method of manufacturing a heat-resisting fiber-reinforced composite material of the present invention is able to control the mixing ratio of different materials in the transition region.

DETAILED DESCRIPTION OF THE INVENTION

The preferred embodiments of the present invention is described in the following with reference to the appended drawings. It is to be understood that the present invention is not limited only to these embodiments.

First Embodiment

A heat-resisting fiber-reinforced composite material related to the first embodiment of the present invention is to be used for a product or part such as a gas turbine combustor, moving blade and stationary blade which generate temperature distribution in use, wherein a portion where the temperature in use is the temperature range (it is here to be the medium to low temperature range) for which heat-resisting fiber-reinforced glass can be used is heat-resisting fiber-reinforced glass and a portion where the temperature in use exceeds the temperature range (it is here to be the high temperature range) for which heat-resisting fiber-reinforced glass can be used is heat-resisting fiber-reinforced ceramics. That is, a region of heat-resisting fiber-reinforced glass and a region of heat-resisting fiber-reinforced ceramics are selectively formed in a single heat-resisting fiber-reinforced composite material. Here, the heat-resisting fiber is, for example, ceramic fiber.

Also, since the thermal expansion of glass is greater than that of ceramics, by using heat-resisting fiber-reinforced glass to make the medium to low temperature range, the difference in thermal expansion between the glass and metal is less as compared with the case of manufacturing the entire combustor by using heat-resisting fiber-reinforced ceramics. Accordingly, the thermal stress at the portion where the combustor is fitted to the gas turbine body can be reduced. Moreover, as described, since heat-resisting fiber-reinforced glass is extremely higher in strength than heat-resisting fiber-reinforced ceramics, when a combustor is made by using a heat-resisting fiber-reinforced composite material of the present invention, it is extremely less in necessity to reduce the thermal stress in relation to the fitting structure and also the material of the fitting portion is improved in strength, thereby the configuration for fitting to a gas turbine body is remarkably simplified and it is possible to install the combustor, for example, by using bolts and nuts.

Next, with reference to the drawings, a method of manufacturing such heat-resisting fiber-reinforced composite material is described in accordance with an example of the manufacture of a combustor liner (hereinafter called "liner") L for a gas turbine. Also, ceramic fiber is here employed as heat-resisting fiber.

Figure 1:
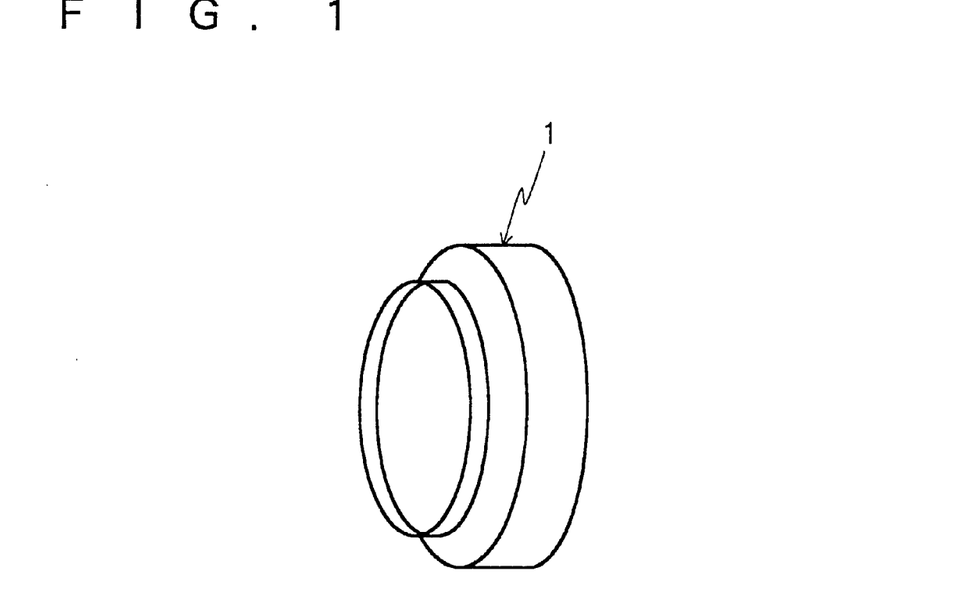
FIG. 1 is an explanatory diagram of the procedure for a method of manufacturing a heat-resisting fiber-reinforced composite material of the present invention, showing a state of a preformed molding.
Figure 2:
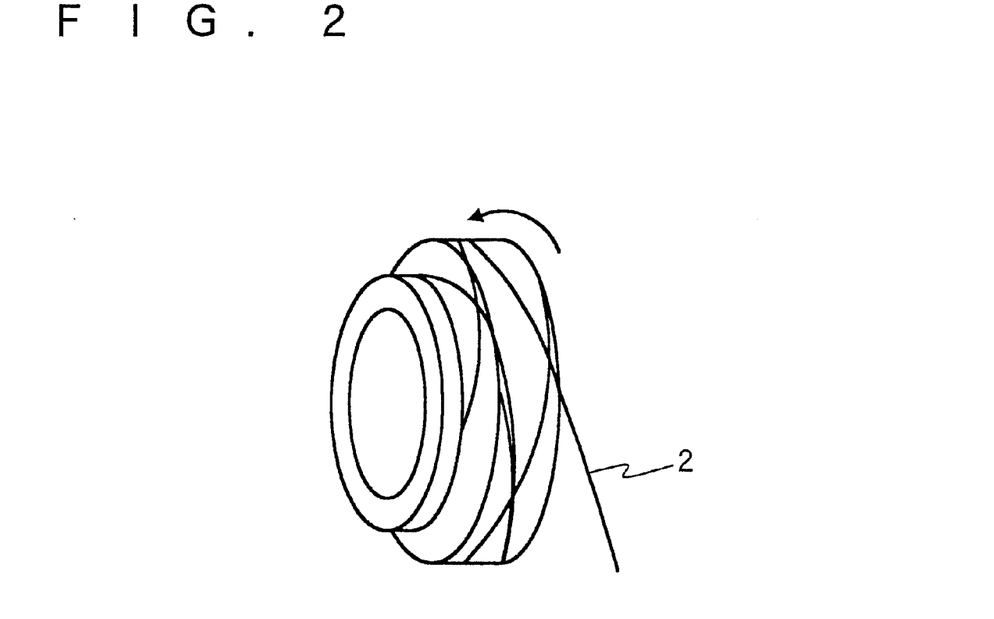
FIG. 2 is an explanatory diagram showing a state of a preformed molding being formed by a filament winding method.
Figure 3:
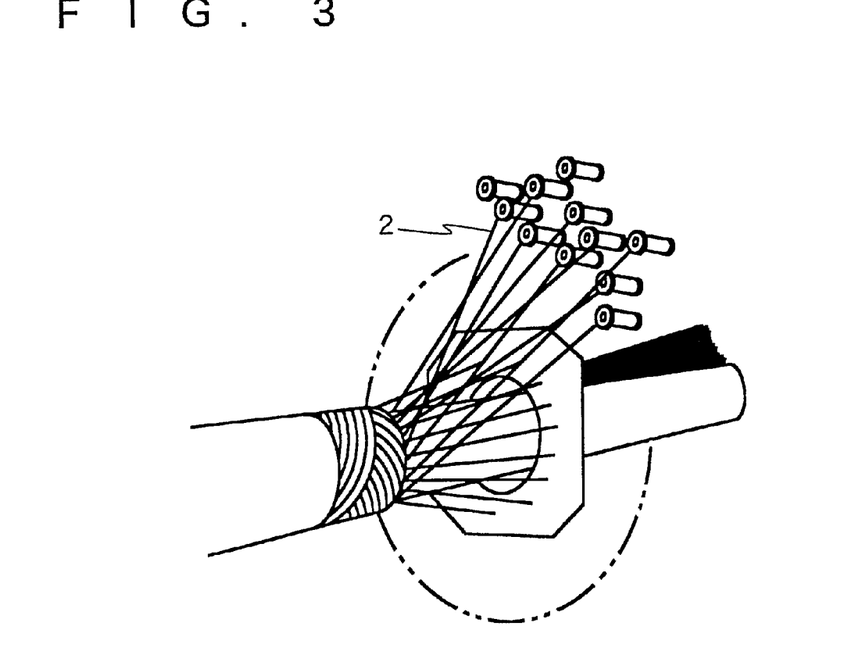
FIG. 3 is an explanatory diagram showing a state of a preformed molding being formed by a braiding method.

(1) Ceramic fiber is preformed into a shape of liner L to make a preformed molding 1 (see FIG. 1). As the methods of manufacturing the preformed molding 1, a filament winding method (see FIG. 2), braiding method (see FIG. 3), and three-dimensional weaving method are available. In FIG. 2 and FIG. 3, numeral 2 represents for ceramic fiber.

Figure 4:
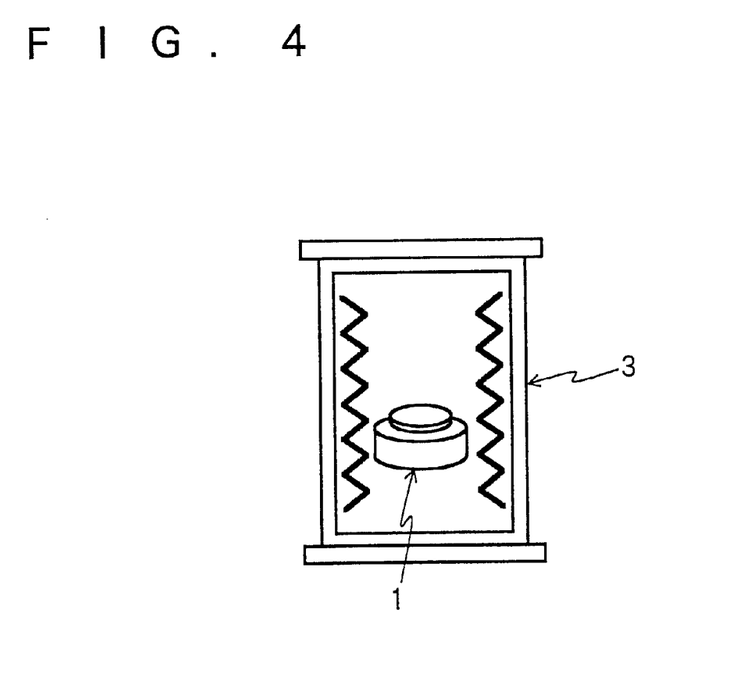
FIG. 4 is an explanatory diagram of the procedure for a method of manufacturing a heat-resisting fiber-reinforced composite material related to the first embodiment of the present invention, showing a state of fiber surface treatment.

(2) After preforming, the surface of each ceramic fiber 2 of the preformed molding 1 is subjected to surface treatment in order to prevent the surface reaction during processing and to control the surface strength of ceramic fiber 2 (see FIG. 4). That is, surface treatment is performed on the fiber. The fiber surface treatment is performed by coating the surface of ceramic fiber 2 with carbon, boron nitride or silicon carbide, for example, according to a CVD method. In the coating process based on the CVD method, the preformed molding 1 is stored in a reaction vessel 3, and the material gas is supplied into the reaction vessel 3. As the material gas, for example, in the case of carbon coating, a mixed gas containing hydrogen gas as carrier gas for hydrogen carbide (such as $CH_4$, $C_2H_4$, $C_3H_6$) as carbon source gas is used, and in the case of boron nitride coating, a mixed gas containing hydrogen gas as carrier gas for boron trichloride ($BCl_3$) gas as boron source gas and ammonia gas ($NH_3$) as nitrogen source gas is used, and in the case of silicon carbide coating, a mixed gas containing nitrogen gas as carrier gas for $SiCl_4$ gas as silicon source gas and hydrogen carbide (such as $CH_4$, $C_2H_4$, $C_3H_6$) as carbon source gas or a mixed gas containing hydrogen gas as carrier gas for $SiCl_3 (CH_3)_2$ gas as silicon and carbon source gas is used.

Figure 5:
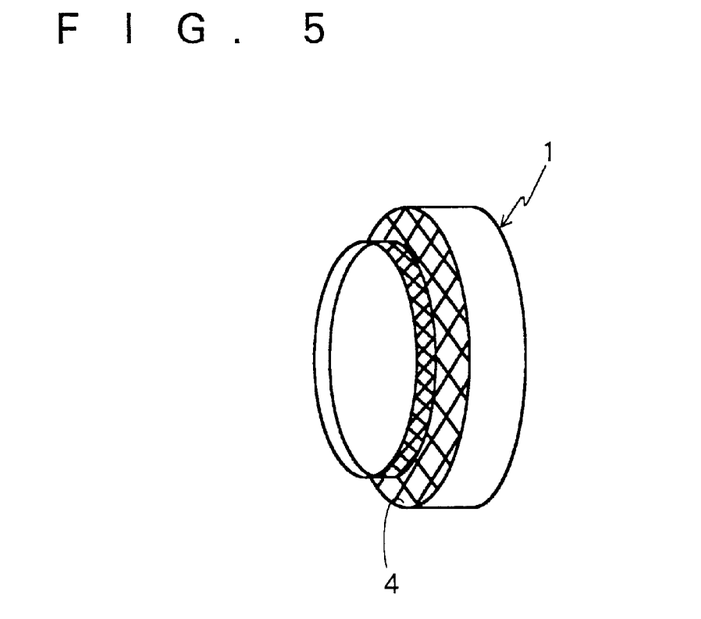
FIG. 5 is an explanatory diagram of the procedure for a method of manufacturing a heat-resisting fiber-reinforced composite material related to the first embodiment of the present invention, showing a state of masking of a specified portion of preformed molding.

(3) The preformed molding 1 is subjected to masking 4. The portion subjected to the masking 4 is a portion corresponding to the medium to low temperature range of liner L or a portion where ceramic fiber-reinforced glass is used (see FIG. 5). The masking material used for the masking 4 is properly selected in accordance with the method of forming ceramic base material (matrix), described later, in ceramic fiber 2. For example, resin is used in the case of a ceramic precursor impregnation burning method, and also for example, carbon, carbon powder, carbon sheet, carbon felt, carbon paste and boron nitride powder are used in the case of a vapor phase chemical impregnation method.

Figure 6:
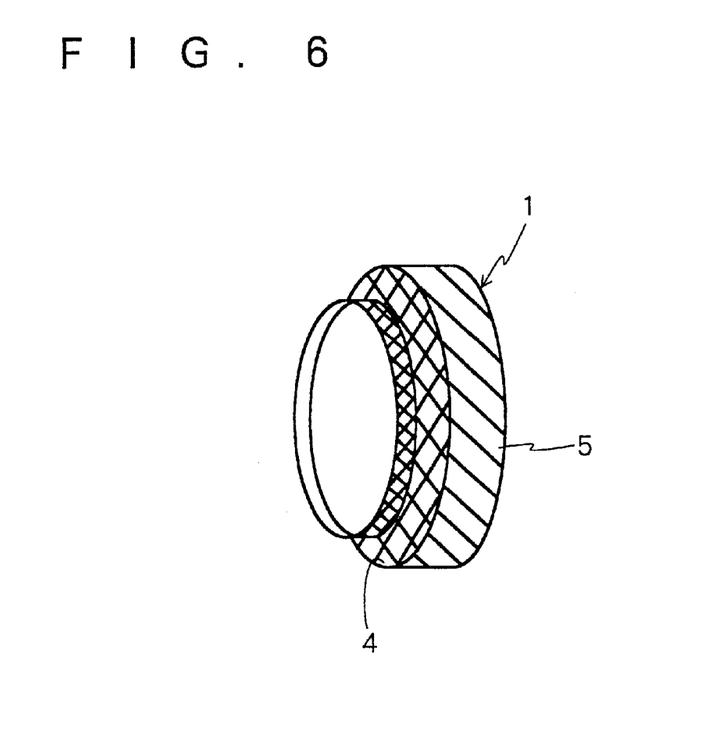
FIG. 6 is an explanatory diagram of the procedure for a method of manufacturing a heat-resisting fiber-reinforced composite material related to the first embodiment of the present invention, showing a state of a ceramic matrix formed on a part of preformed molding.
Figure 7:
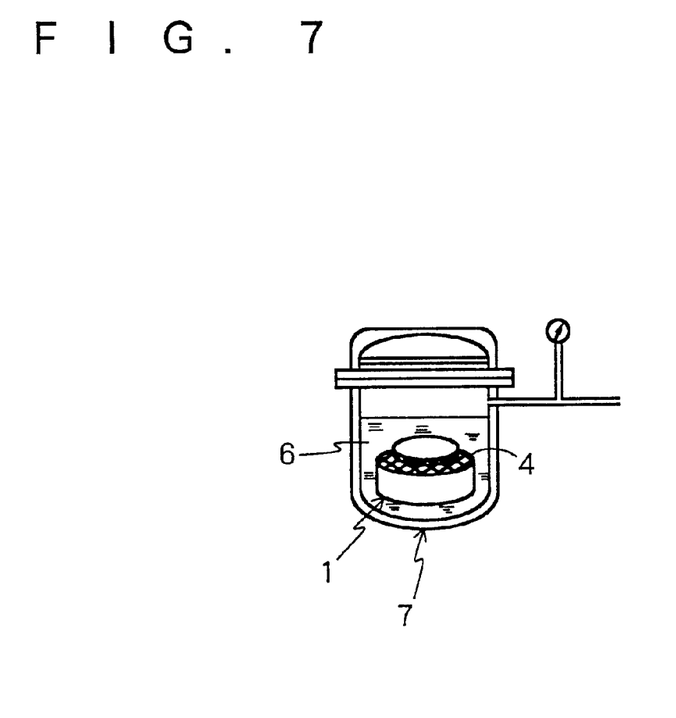
FIG. 7 is an explanatory diagram of the procedure for forming a ceramic matrix by a ceramic precursor impregnation burning method in the method of manufacturing a heat-resisting fiber-reinforced composite material related to the first embodiment of the present invention, showing a state of impregnating a preformed molding with ceramic precursor.
Figure 8:
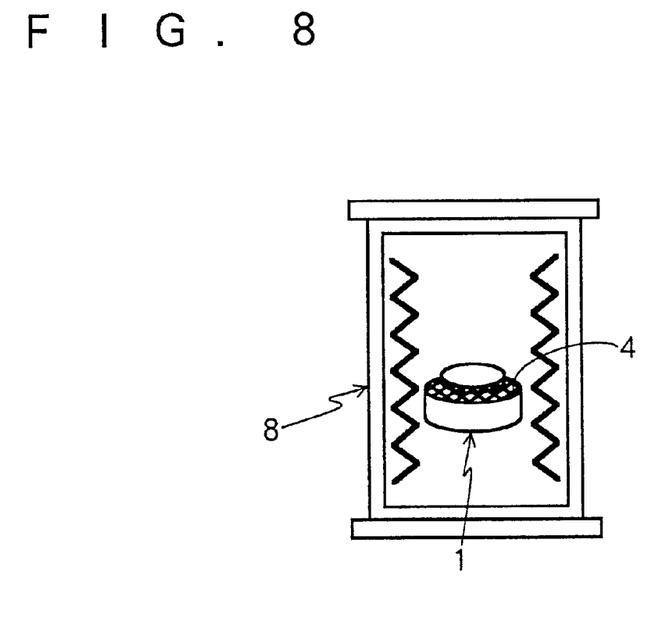
FIG. 8 is an explanatory diagram of the procedure for forming a ceramic matrix by a ceramic precursor impregnation burning method in the method of manufacturing a heat-resisting fiber-reinforced composite material related to the first embodiment of the present invention, showing a state of burning a preformed molding impregnated with ceramic precursor.
Figure 9:
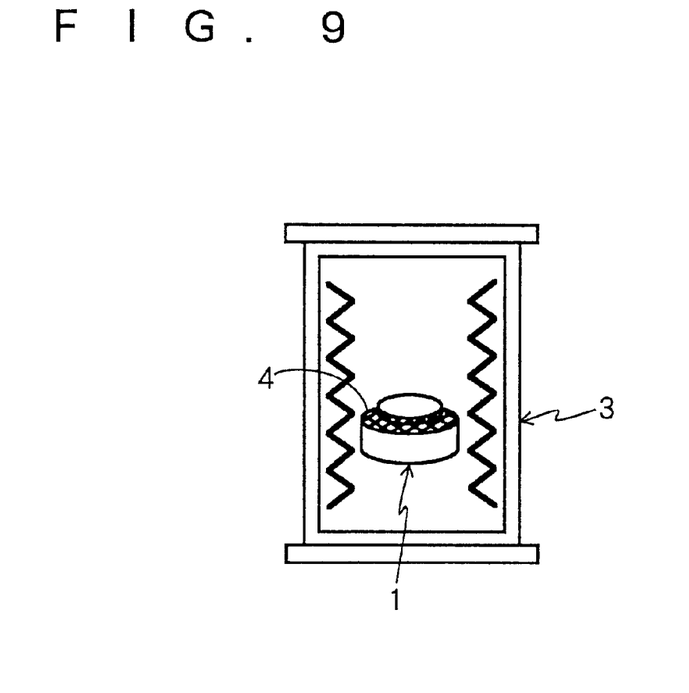
FIG. 9 is an explanatory diagram showing a state of forming a ceramic matrix on a part of preformed molding by a vapor phase chemical impregnation method in the method of manufacturing a heat-resisting fiber-reinforced composite material related to the first embodiment of the present invention.

(4) Ceramic base material (matrix) is formed in the ceramic fiber 2 of preformed molding 1 subjected to masking 4, and the portion corresponding to the high temperature range of liner L, that is, the portion used in the high temperature range of preformed molding 1 is formed by ceramic fiber-reinforced glass 5 (see FIG. 6). As a method for forming ceramic base material (matrix) in the ceramic fiber 2 of the preformed molding 1, for example, a ceramic precursor impregnation burning method (PIP method) and vapor phase chemical impregnation method (CVI method) are employed. In the case of a ceramic precursor impregnation burning method (PIP method), as shown in FIG. 7 and FIG. 8, the preformed molding 1 subjected to masking 4 is dipped into a vessel 7 filled with ceramic precursor 6 such as polycarbosilane, and the vessel 7 is internally maintained at a specified pressure (3~20 at.) and temperature (150~400 degree C.), the portion not subjected to masking 4 of the preformed molding 1 is impregnated with ceramic precursor 6. After that, the preformed molding 1 impregnated with the ceramic precursor 6 is moved into combustor 8 where it is burnt at a temperature in the range of 900 degree C.~1,500 degree C., preferably in the rage of 1,000 degree C.~1,300 degree C. On the other hand, in the case of a vapor phase chemical impregnation method, preformed molding 1 subjected to masking 4 is stored in a reaction vessel 3, and then while the matrix material gas such as $SiCl_4$ gas, $CH_4$, and $H_2$ gas is supplied into the reaction vessel 3, it is heated at a temperature in the range of 900 degree C.~1,350 degree C., preferably in the range of 1,000 degree C.~1,200 degree C. (see FIG. 9).

(5) Masking 4 of preformed molding 1 of which the part used for the high temperature range is ceramic fiber-reinforced ceramics 5 is removed. In the case of a ceramic precursor impregnation burning method, this procedure for removing the masking 4 becomes unneeded because of scattering of the masking material during burning.

Figure 10:
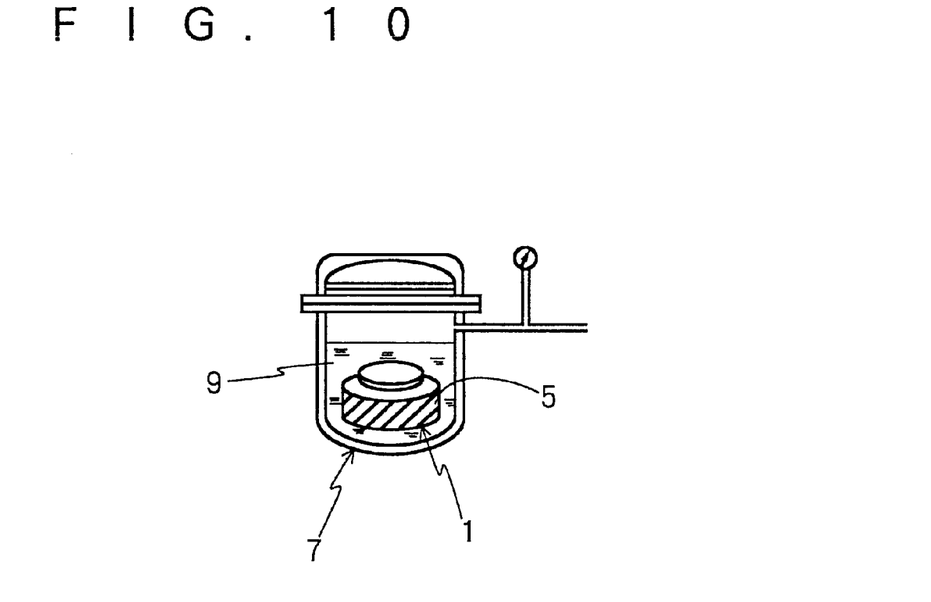
FIG. 10 is an explanatory diagram of the procedure for a method of manufacturing a heat-resisting fiber-reinforced composite material related to the first embodiment of the present invention, showing a state of impregnating a preformed molding, partially forming a ceramic matrix, with a glass slurry.

(6) The preformed molding 1 with masking 4 removed is impregnated with a glass slurry. This can be performed, for example, by dipping the preformed molding 1 into vessel 7 filled with glass slurry 9, followed by maintaining the specified pressure (3~20 at.) and the temperature (50~200 degree C.) in the vessel 7 (See FIG. 10).

Figure 11:
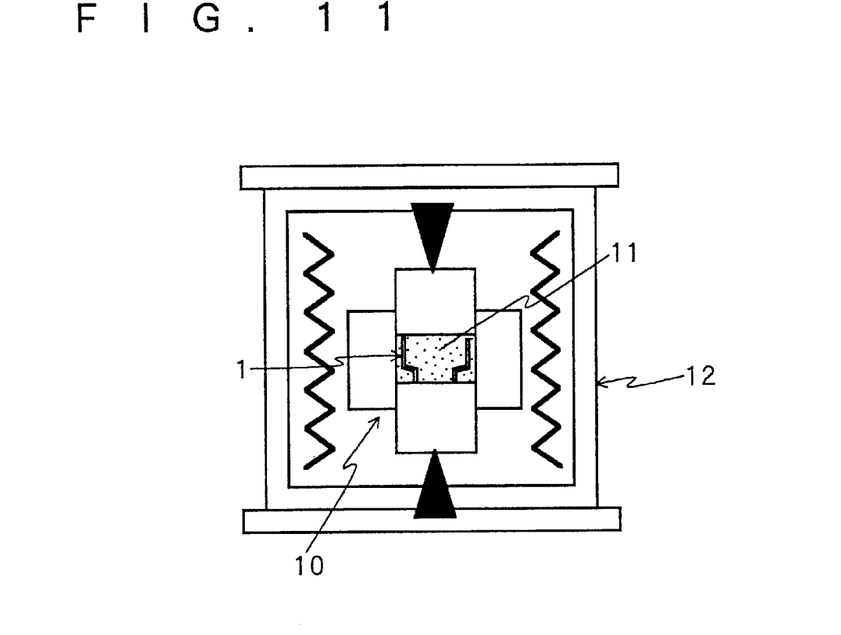
FIG. 11 is an explanatory diagram of the procedure for a method of manufacturing a heat-resisting fiber-reinforced composite material related to the first embodiment of the present invention, showing a state of uniformly pressurizing and heating a preformed molding impregnated with a glass slurry.

(7) The preformed molding 1 impregnated with glass slurry 9 is stored in pressure vessel 10, and then carbon powder or boron nitride powder 11 is filled into the pressure vessel 10 so that the preformed molding 1 can be uniformly pressurized (See FIG. 11).

(8) The pressure vessel 10 containing the preformed molding 1 is stored in heating device 12, and the preformed molding 1 being uniformly pressurized in the pressure vessel is heated by the heating device 12 to let glass be precisely filled into ceramic fiber (see FIG. 11). That is, glass matrix is formed to obtain ceramic fiber-reinforced glass 13. The pressure range is 10 MPa~100 MPa or preferably 30 MPa~60 MPa, and the heating temperature range is 900 degree C.~1,400 degree C. or preferably 1,000 degree C. ~1,300 degree C.

Figure 12:
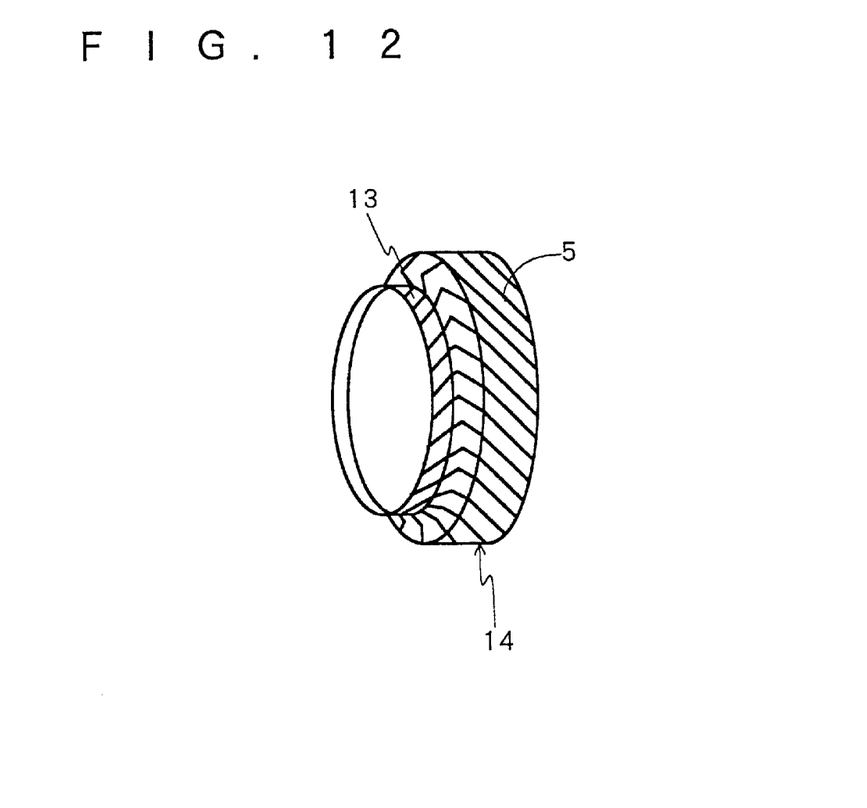
FIG. 12 is a diagram of the structure of a liner manufactured by a method of manufacturing a heat-resisting fiber-reinforced composite material of the present invention.
Figure 13:
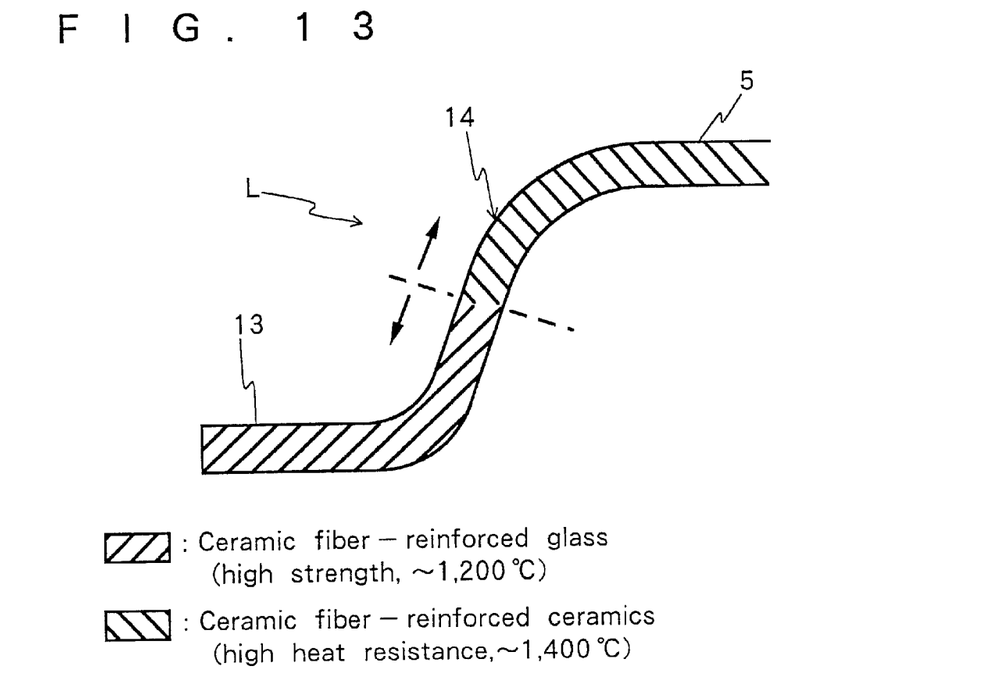
FIG. 13 is an illustration of a liner manufactured by a method of manufacturing a heat-resisting fiber-reinforced composite material related to the first embodiment of the present invention.

Thus, ceramic fiber-reinforced composite material 14 of which ceramic fiber-reinforced ceramics 5 and ceramic fiber-reinforced glass 13 are selectively formed is obtained (see FIG. 12). FIG. 13 is an illustration of liner L obtained in this way.

Figure 14:
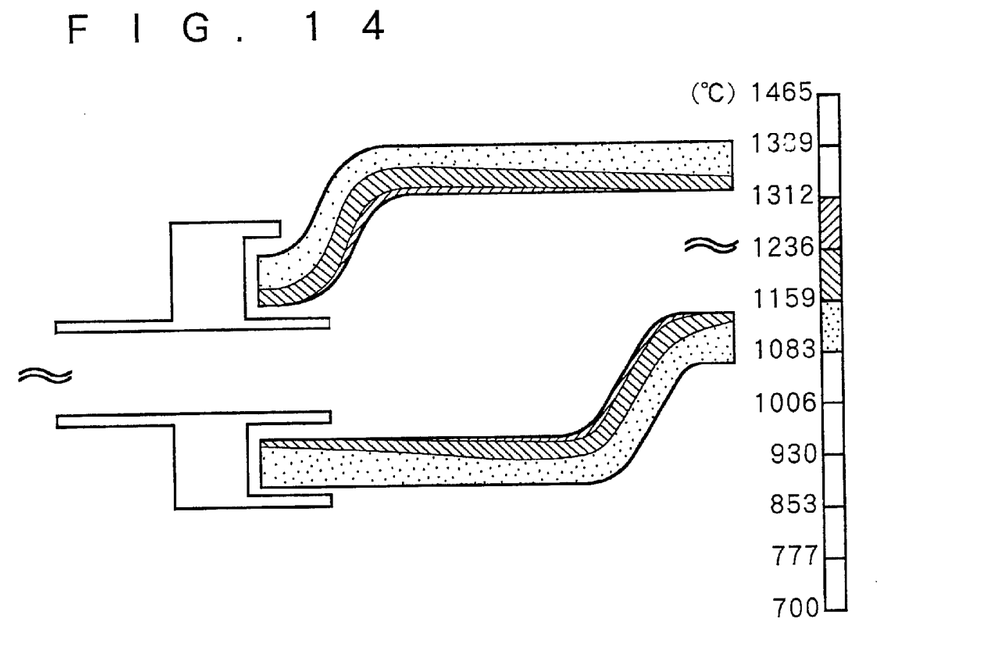
FIG. 14 is an illustration of analysis of heat conduction in a liner manufactured by a method of manufacturing a heat-resisting fiber-reinforced composite material of the present invention.
Figure 15:
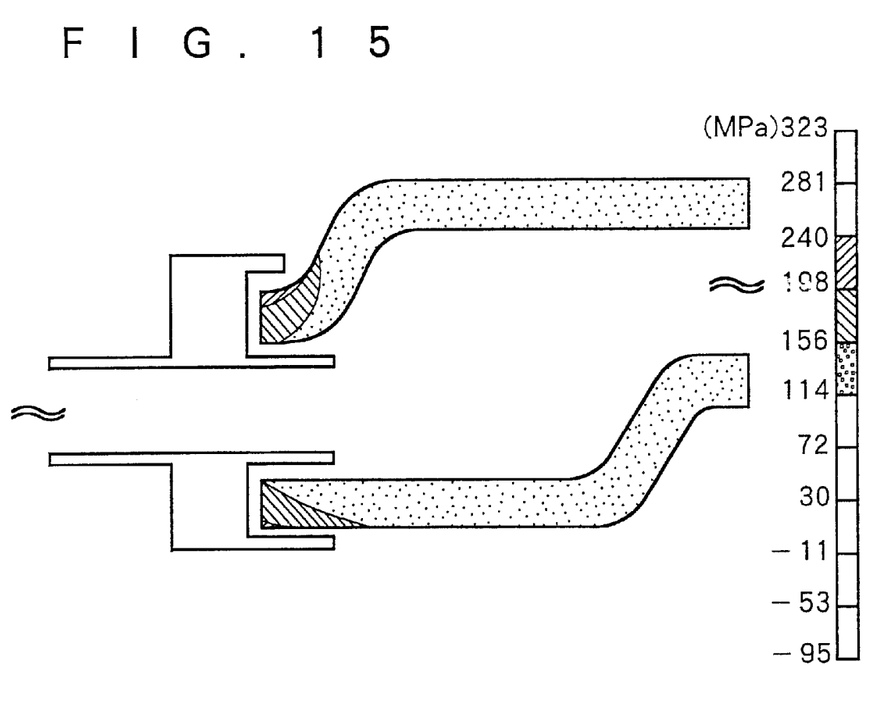
FIG. 15 is an illustration of analysis of heat stress in a liner manufactured by a method of manufacturing a heat-resisting fiber-reinforced composite material of the present invention.

Here, the heat transfer and thermal stress of liner L thus obtained are analyzed and the results are illustrated in FIG. 14 and FIG. 15 respectively. It can be confirmed from the result of heat transfer analysis in FIG. 14 that the temperature of the portion of ceramic fiber-reinforced ceramics 5 is within the heat resistance range of ceramic fiber-reinforced ceramics 5, and from the thermal stress analysis in FIG. 15 that the portion of high-strength ceramic fiber-reinforced glass 13 is high in stress. In FIG. 14 and FIG. 15, taking the convenience in drawing and easier understanding into consideration, the accuracy of each temperature and stress range is somewhat sacrificed.

In the first embodiment, heat resisting fiber-reinforced composite material 14 is made by selectively forming the portion corresponding to the high temperature range with ceramic fiber-reinforced ceramics 5 so as to obtain the desired heat resistance, and by selectively forming the portion corresponding to the medium to low temperature range with ceramic fiber-reinforced glass 13 so as to obtain the desired strength, that is, ceramic matrix and glass matrix are selectively formed. Accordingly, when liner L or the like is manufactured by using heat-resisting fiber-reinforced composite material 14 obtained by the first embodiment, it is possible to obtain both of the desired heat resistance and strength. Consequently, no cooling is needed for assurance of the desired heat resistance and it is possible to simplify the structure and to improve the energy efficiency.

Second Embodiment

A heat-resisting fiber-reinforced composite material related to the second embodiment of the present invention is to be used for a product or part such as a gas turbine combustor, moving blade and stationary blade which generate temperature distribution in use, wherein a portion where the temperature in use is in the temperature range (it is here to be the medium to low temperature range) for which heat-resisting fiber-reinforced glass can be used is heat-resisting fiber-reinforced glass of which thermal expansion coefficient is greater than that of heat-resisting fiber-reinforced ceramics and a portion where the temperature in use exceeds the temperature range (it is here to be the high temperature range) for which heat-resisting fiber-reinforced glass can be used is heat-resisting fiber-reinforced ceramics, and further, the boundary between heat-resisting fiber-reinforced glass and heat-resisting fiber-reinforced ceramics is a transition region. That is, for the boundary between the heat-resisting fiber-reinforced ceramics region on the high temperature side and the heat-resisting fiber-reinforced glass region on the medium to low temperature side, for example, heat-resisting fiber-reinforced ceramics is used for the inner side exposed to the flames, and heat-resisting fiber-reinforced glass is used for the outer side. At the same time, the thickness of the heat-resisting fiber-reinforced ceramics layer is gradually reduced towards the heat-resisting fiber-reinforced glass region on the low temperature side, while the thickness of the heat-resisting fiber-reinforced glass layer is gradually increased towards the heat-resisting fiber-reinforced glass region. Here, ceramic fiber is, for example, used as heat-resisting fiber.

In this way, by using heat-resisting fiber-reinforced glass of which thermal expansion coefficient is greater than that of heat-resisting fiber-reinforced ceramics for the portion of medium to low temperature range, the difference in thermal expansion coefficient from metal can be lowered as compared with the case of using heat-resisting fiber-reinforced ceramics for the entire combustor. Also, by properly adjusting the component of heat-resisting fiber-reinforced glass. the elastic modulus in the medium to low temperature range to the high temperature range can be lowered. Accordingly, it is possible to greatly reduce the thermal stress at the portion where a combustor is fitted to a gas turbine body. Also, as described, since the strength of heat-resisting fiber-reinforced glass is extremely high as compared with heat-resisting fiber-reinforced ceramics, when a combustor is formed by using a heat-resisting fiber-reinforced composite material of the present embodiment, there will become almost unnecessary to reduce the thermal stress because of the fitting structure and in addition the material used for fitting is improved in strength. Consequently, the configuration of the portion fitted to the gas turbine body may be remarkably simplified, and for example, it becomes possible to use bolts and nuts for the installation. Furthermore, the boundary between the heat-resisting fiber-reinforced glass region and the heat-resisting fiber-reinforced ceramics region is a transition region, thereby bringing about excellent effects to reduce the stress at the boundary.

Next, the method of manufacturing a heat-resisting fiber-reinforced composite material having such configuration is described in accordance with an example of the manufacture of a gas turbine combustor liner (hereinafter called "liner") L with reference to the drawings. Also, ceramic fiber is used here as heat-resisting fiber.

(1) Ceramic fiber is preformed into a shape of liner L to make a preformed molding 1 (see FIG. 1). As the methods of manufacturing the preformed molding 1, a filament winding method (see FIG. 2), braiding method (see FIG. 3), and three-dimensional weaving method are employed. In FIG. 2 and FIG. 3, numeral 2 represents ceramic fiber.

Here, in order to make the boundary between ceramic fiber-reinforced ceramics region and ceramic fiber-reinforced glass region to be a transition region, weaving (mixed weaving) to form preformed molding 1 is performed not only with ceramic fiber 2 but also with ceramic fiber 2 and glass fiber 15 or with ceramic fiber 2 of which the specified portion is impregnated with glass powder. Each method is described in the following.

Figure 16:
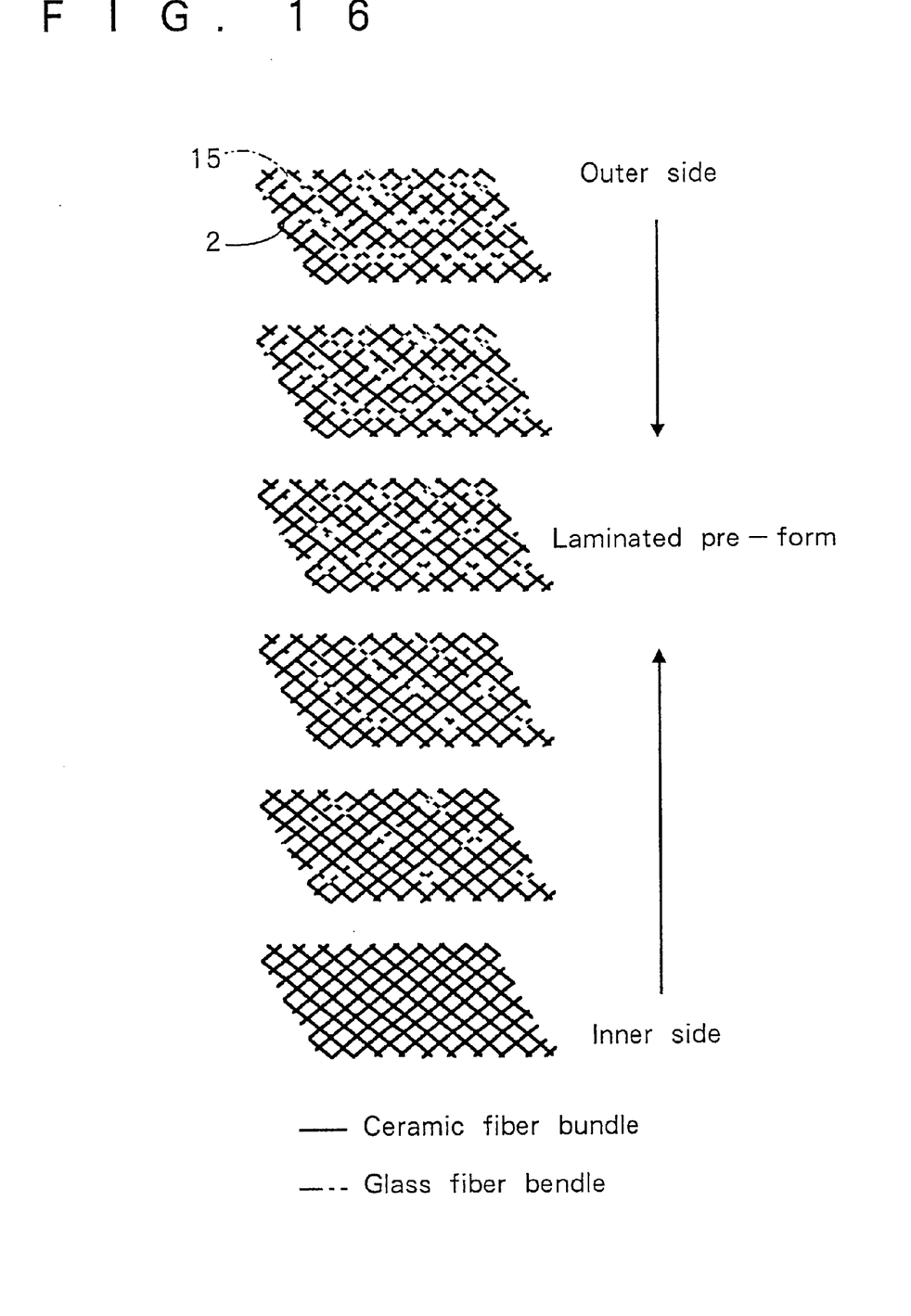
FIG. 16 is an illustration showing separately each layer of laminated pre-form by a fabric woven by mixing glass fiber and ceramic fiber in the method of manufacturing a heat-resisting fiber-reinforced composite material related to the second embodiment of the present invention.

First explained with reference to FIG. 16 is a method of forming the preformed molding 1 by mixed weaving of ceramic fiber 2 and glass fiber 15.

Ceramic fiber 2 and glass fiber 15 are woven and laminated while changing the mixing ratio every layer to make a laminated pre-form or a preformed molding 1. As glass fiber 15, fiber that turns into a glass matrix when melted at high temperatures as described later is selected, for example, $SiO_2$ fiber, $ZrO_2$—$SiO_2$-based fiber, $Na_2O$—$ZrO_2$—$SiO_2$-based fiber, $SiO_2$—$Al_2O_3$-based fiber, $SiO_2$—$Al_2O_3$—$B_2O_3$-based fiber.

As for the fabric of the innermost layer that is exposed to the flames in lamination, the mixing ratio of ceramic fiber 2 is 100% and that of glass fiber 15 is 0%. That is, the innermost layer is to be fabric comprising only ceramic fiber 2. This is because great importance is attached to heat resistance. As for the second and other layers, the ratio of glass fiber 15 is gradually increased. And, as for the outermost layer, ceramic fiber 2 is about 20% and glass fiber 15 is about 80%. The purpose of this is to improve the strength of the boundary portion. Also, the reason for specifying the mixing ratio of glass fiber 2 at the outermost layer as aforementioned is that the mixing ratios of glass fiber 15 by 100% and ceramic fiber 2 by 0% are inappropriate because the glass fiber 15 is then completely melted during the treatment at high temperatures to become fiberless. Incidentally, weaving of the outermost layer is not limited to the aforementioned mixing ratio but it is possible to properly change the ratio according to the temperature conditions adapted for the heat-resisting fiber-reinforced composite material.

Since the mixing ratios in weaving are set as aforementioned, the boundary between the ceramic fiber-reinforced glass region and ceramic fiber-reinforced ceramics region of the preformed molding 1 obtained gradually transfers from ceramic fiber-reinforced glass region to ceramic fiber-reinforced ceramics region. That is, it becomes a transition region between ceramic fiber-reinforced glass region and ceramic fiber-reinforced ceramics region.

Thus, it is possible to set the mixing ratio in weaving as desired every laminated layer in accordance with this method and to form the ceramic and glass in the desired regions of the matrix at the desired ratios. That is, it is possible to control the mixing ratios of ceramic and glass in the matrix in a three-dimensional manner.

Figure 17:
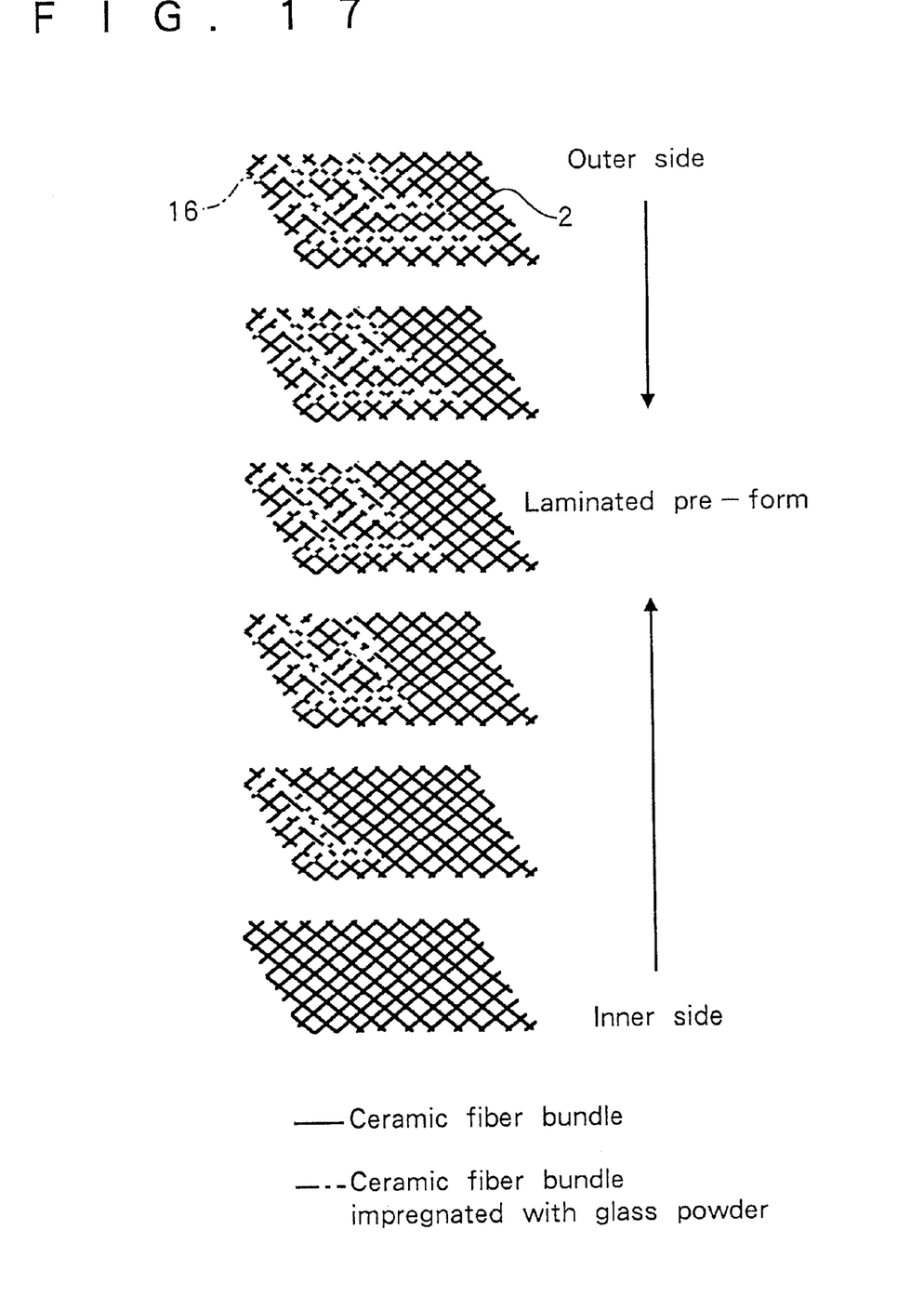
FIG. 17 is an illustration showing separately each layer of laminated pre-form by a fabric of ceramic fiber impregnated with glass powder in the method of manufacturing a heat-resisting fiber-reinforced composite material related to the second embodiment of the present invention.

Described next with reference to FIG. 17 is a method of making preformed molding 1 by weaving ceramic fiber 2 of which the specified portion is impregnated with glass powder.

A portion of preformed moldong 1 to which a portion of ceramic fiber 2, the material, is woven nearly correctly calculated at the time of weaving. In this connection, a portion corresponding to the portion where a glass region of the matrix of ceramic fiber 2 is formed is previously impregnated with glass powder, that is, the continued specified portion of ceramic fiber 2 is previously impregnated, by dipping, with a slurry of powder glass melted by a solvent, and by using the ceramic fiber 2, a laminated pre-form or a preformed molding 1 is formed through weaving and laminating processes.

In this case, ceramic fiber 2 woven into a fabric of the innermost layer which is exposed to the flames in lamination is not impregnated with glass powder. This is also, as described above, because great importance is attached to heat resistance. As for the second and other layers, portion 16 impregnated with glass powder is gradually expanded in ceramic fiber 2. And, as for ceramic fiber 2 used to weave a fabric of the outermost layer, portion 16 impregnated with glass powder is adjusted so that the mixing ratio of ceramic is about 20% in the form of matrix. The purpose of this is to improve the strength of the boundary portion. Incidentally, the impregnation ratio of glass powder in ceramic fiber 2 used to weave a fabric of the outermost layer is not limited to the aforementioned ratio but it is possible to properly change the ratio according to the temperature conditions adapted for the heat-resisting fiber-reinforced composite material.

Since the ceramic fiber 2 is impregnated with glass powder as mentioned above, the boundary between the ceramic fiber-reinforced glass region and ceramic fiber-reinforced ceramics region of the preformed molding 1 obtained gradually transfers from ceramic fiber-reinforced glass region to ceramic fiber-reinforced ceramics region. That is, it becomes a transition region between ceramic fiber-reinforced glass region and ceramic fiber-reinforced ceramics region.

Thus, it is possible to arrange the portion impregnated with glass powder at the desired position of the fabric comprising each layer in accordance with this method and to form the ceramic and glass in the desired regions of the matrix at the desired ratios. That is, it is possible to control the mixing ratios of ceramic and glass in the matrix in a three-dimensional manner.

Figure 18:
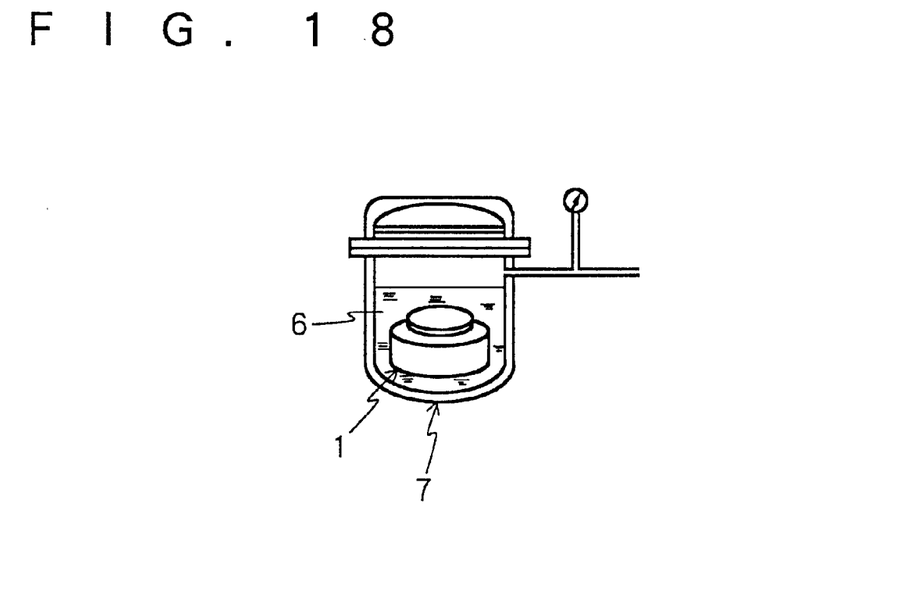
FIG. 18 is an explanatory diagram of the procedure for forming a ceramic matrix by a ceramic precursor impregnation burning method in the method of manufacturing a heat-resisting fiber-reinforced composite material related to the second embodiment of the present invention, showing a state of impregnating a preformed molding with ceramic precursor.
Figure 19:
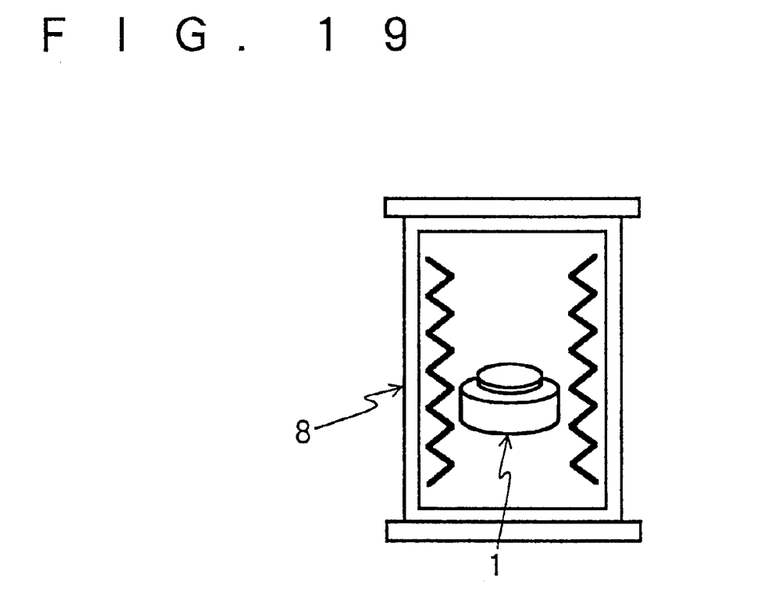
FIG. 19 is an explanatory diagram of the procedure for forming a ceramic matrix by a ceramic precursor impregnation burning method in the method of manufacturing a heat-resisting fiber-reinforced composite material related to the second embodiment of the present invention, showing a state of burning a preformed molding impregnated with ceramic precursor.

(2) Ceramic material (matrix) is formed in the ceramic fiber 2 of preformed molding 1 prepared by any one of the above methods. That is, a matrix forming process is executed. As such processing method, for example, a ceramic precursor impregnation burning method (PIP method) and vapor phase chemical impregnation method (CVI method) are employed. In the case of a ceramic precursor impregnation burning method (PIP method), as shown in FIG. 18 and FIG. 19, preformed molding 1 is dipped into vessel 7 filled with ceramic precursor 6 such as polycarbosilane, then the vessel 7 is internally maintained at a specified pressure (3~20 at.) and temperature (150~400 degree C.) to impregnate the preformed molding 1 with the ceramic precursor 6, and after that, the preformed molding 1 impregnated with the ceramic precursor 6 is moved into combustor 8 where it is burnt at a temperature in the range of 900 degree C.~1,500 degree C., preferably in the rage of 1,000 degree C.~1, 300 degree C.

Figure 20:
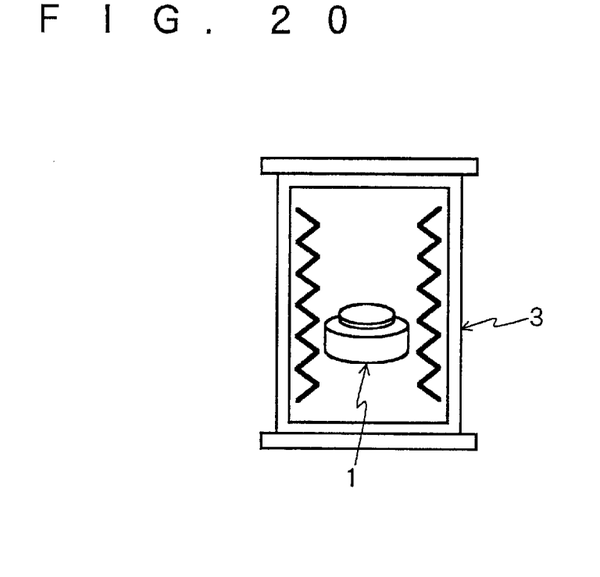
FIG. 20 is an explanatory diagram showing a state of forming a ceramic matrix on a specified part of preformed molding by a vapor phase chemical impregnation method in the method of manufacturing a heat-resisting fiber-reinforced composite material related to the second embodiment of the present invention.

On the other hand, in the case of a vapor phase chemical impregnation method, as shown in FIG. 20, preformed molding 1 is stored in a reaction vessel 3, and then while the matrix material gas such as $SiCl_4$ gas, $CH_4$, and $H_2$ gas is supplied into the reaction vessel 3, it is heated at a temperature in the range of 900 degree C.~1,350 degree C. or preferably in the range of 1,000 degree C.~1,200 degree C.

Figure 21:
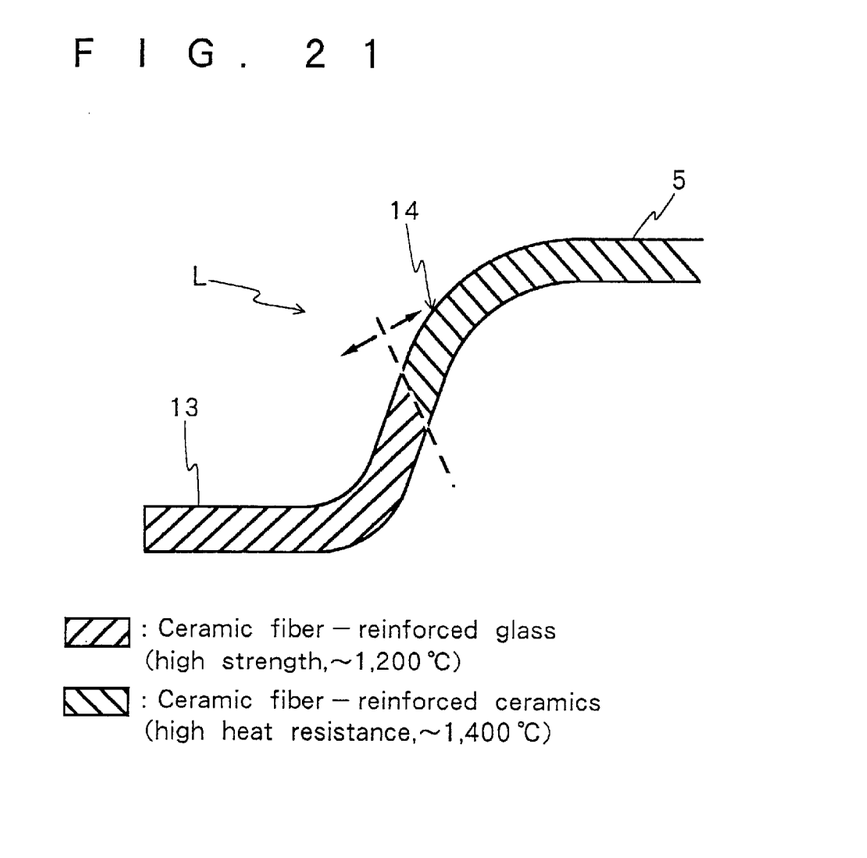
FIG. 21 is an illustration of a liner manufactured by using a heat-resisting fiber-reinforced composite material related to the second embodiment of the present invention.

Also, by burning and heating at high temperatures, glass fiber 15 woven in preformed molding 1 or glass powder contained in preformed molding 1 is melted to adapt to the fiber, thereby becoming a glass matrix. Also, ceramic fiber-reinforced ceramics 5 and ceramic fiber-reinforced glass 13 are selectively formed, and also heat-resisting fiber-reinforced composite material 14 of which the boundary between ceramic fiber-reinforced ceramics 5 and ceramic fiber-reinforced glass 13 is a transition region can be obtained (see FIG. 12). FIG. 21 is an illustration of liner L obtained in this way.

Here, the heat transfer and thermal stress of liner L thus obtained are analyzed and the results are illustrated in FIG. 14 and FIG. 15 respectively. It can be confirmed from the result of heat transfer analysis in FIG. 14 that the temperature of the portion of ceramic fiber-reinforced ceramics 5 is within the heat resistance range of ceramic fiber-reinforced ceramics 5, and from the thermal stress analysis in FIG. 15 that the portion of high-strength ceramic fiber-reinforced glass 13 is high in stress. In FIG. 14 and FIG. 15, taking the convenience in drawing and easier understanding into consideration, the accuracy of each temperature and stress range is somewhat sacrificed.

Thus, in heat resisting fiber-reinforced composite material 14 of the second embodiment, since preformed molding 1 is formed by a fabric woven by mixing glass fiber 15 and ceramic fiber 2 at specified ratios or ceramic fiber 2 impregnated with glass powder at a specified ratio, it is possible to selectively form the portion corresponding to the high temperature range with ceramic fiber-reinforced ceramics 5 so as to obtain the desired heat resistance and to selectively form the portion corresponding to the medium to low temperature range with ceramic fiber-reinforced glass 13 so as to obtain the desired strength, and moreover, the stress at the boundary can be reduced because the boundary between ceramic fiber-reinforced ceramics 5 and ceramic fiber-reinforced glass 13 is a transition region.

Accordingly, when liner L or the like is manufactured by using heat-resisting fiber-reinforced composite material 14 of the second embodiment, it is possible to obtain both of the desired heat resistance and strength. Consequently, no cooling is needed for assurance of the desired heat resistance and it is possible to simplify the structure and to improve the energy efficiency. Also, the stress at the boundary between ceramic fiber-reinforced ceramics 5 and ceramic fiber-reinforced glass 13 can be reduced and is it possible to improve the durability.

Also, in the manufacturing method for heat-resisting fiber-reinforced composite material 14 of the second embodiment, the desired heat resistance is attained by selectively forming the portion corresponding to the high temperature range with ceramic fiber-reinforced ceramics 5, and the desired strength is attained by selectively forming the portion corresponding to the medium to low temperature range with ceramic fiber-reinforced glass 13, and further, heat-resisting fiber-reinforced composite material 14 of which the boundary between ceramic fiber-reinforced ceramics 5 and ceramic fiber-reinforced glass 13 is a transition region can be manufactured. That is, the mixing ratios of ceramic and glass at the boundary between ceramic fiber-reinforced ceramics region and ceramic fiber-reinforced glass region can be easily controlled.

As described above, by using the fiber-reinforced composite material of the present invention, both of the required heat resistance and strength may be realized at the same time, and excellent advantages such as reduction of the stress at the boundary between different materials is obtained. Accordingly, it is possible to improved the durability of products or parts manufactured by using the fiber-reinforced composite material of the present invention.

On the other hand, the heat-resisting fiber-reinforced composite material of the present invention, having a configuration as described, brings about excellent effects such as the manufacture of a heat-resisting fiber-reinforced composite material having aforementioned characteristics. Also, the method of manufacturing a heat-resisting fiber-reinforced composite material of the present invention may bring about excellent advantages such as being able to make the boundary between ceramic fiber-reinforced ceramics region and ceramic fiber-reinforced glass region to be a transition region of the desired mixing ratios.

We claim:

1. A heat-resisting fiber-reinforced composite material used for a product or a part that generates temperature distribution, comprising:

a first portion having a first thermal expansion coefficient corresponding to a medium to low temperature range and;

a second portion having a second thermal expansion coefficient being less than the first thermal expansion coefficient corresponding to a high temperature range and laminated to the first portion, wherein a boundary between the first portion corresponding to the medium to low temperature range and the second portion corresponding to the high temperature range is a transition region where facially opposing surfaces of the first and second portions are connected together.

2. A heat-resisting fiber-reinforced composite material used for a product or a part that generates temperature distribution, comprising:

a first portion corresponding to a medium to low temperature range is heat-resisting fiber-reinforced glass having a thermal expansion coefficient greater than that of heat-resisting fiber-reinforced ceramics, and a second portion corresponding to a high temperature range is heat-resisting fiber-reinforced ceramics and laminated to the first portion, wherein a boundary between the first portion corresponding to the medium to low temperature range and the second portion corresponding to the high temperature range is a transition region of heat-resisting fiber-reinforced glass and heat-resisting fiber-reinforced ceramics where facially opposing surfaces of the first and second portions are connected together.

3. The heat-resisting fiber-reinforced composite material of claim 1 or 2, wherein the heat-resisting fiber is a ceramic fiber.

4. A method of manufacturing a heat-resisting fiber-reinforced composite material used for a product or a part that generates temperature distribution, wherein a first portion corresponding to a medium to low temperature range is heat-resisting fiber-reinforced glass having a thermal expansion coefficient greater than heat-resisting fiber-reinforced ceramics, a second portion corresponding to a high temperature range being heat-resisting fiber-reinforced ceramics, and a boundary between the first portion corresponding to the medium to low temperature range and the second portion corresponding to the high temperature range is a transition region of heat-resisting fiber-reinforced glass and heat-resisting fiber-reinforced ceramics where facially opposing surfaces of the first and second portions are connected together, comprising the steps of:

pre-forming a molding in a desired shape through weaving and subjecting the pre-formed molding to matrix forming treatment in order to obtain a heat-resisting fiber-reinforced composite material in a desired shape.

5. The method of manufacturing a heat-resisting fiber-reinforced composite material of claim 4, wherein weaving of glass fiber and ceramic fiber is performed while properly adjusting the mixing ratios of both fibers.

6. the method of manufacturing a heat-resisting fiber-reinforced composite material of claim 4, wherein weaving of ceramic fiber impregnated with glass powder at a specified ratio is performed.

* * * * *